S. F. MERRITT.
EYE-GLASS HOLDER.
No. 7,743. Reissued June 12, 1877.
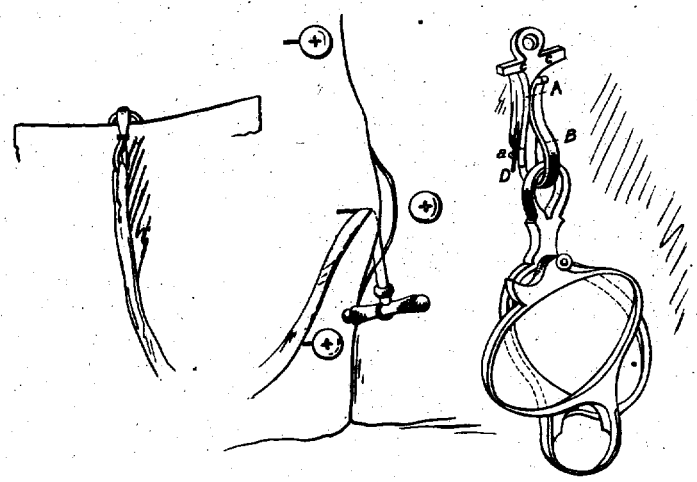
ATTEST.
S. J. Gordon
John W. Ripley
S. F. Merritt
INVENTOR.
N. PETERS, PHOTO-LITHOGRAPHER, WASHINGTON, D. C.

UNITED STATES PATENT OFFICE.

S. F. MERRITT, OF SPRINGFIELD, MASSACHUSETTS.

IMPROVEMENT IN EYEGLASS-HOLDERS.

Specification forming part of Letters Patent No. 58,867, dated October 16, 1866; reissue No. 7,713, dated June 12, 1877; application filed June 4, 1877.

*To all whom it may concern:*

Be it known that I, SAMUEL F. MERRITT, of Springfield, county of Hampden, State of Massachusetts, have invented a new and useful Improvement in Eyeglass - Suspenders, which is fully set forth in the following specification and accompanying drawing, in which the figure represents a perspective view of my invention, supporting a pair of eyeglasses.

Previous to my invention, the numerous class of persons requiring eyeglasses have been compelled to suspend them from their necks by a string—a very inconvenient mode of securing them, as their position at any given moment was uncertain, and safety against fracture was not much secured.

The object of my invention is to provide an ornamental and useful means of securing them to the apparel, where they may always be instantaneously found, where there will be little danger of breakage, and so contrived as to be readily attached and detached at will.

I accomplish this by a device consisting of a spring snap-hook, having an ordinary breast-pin and catch upon the back side thereof. To aid in keeping the device in position, there is, preferably, a cross-bar near the top of the shank. It may be in the form of a ring, or any other form that presents an extended flat surface at the back.

A B designate the parts constituting the snap-hook, A being the shank and B the hook, the end of the latter so bent as to spring constantly against the former and prevent the casual dropping off of an article hung thereon. C C, as represented in the drawing, is a bar at or near the top of the shank, extending out on either side, which renders the device ornamental, by giving it somewhat the appearance of an anchor, and prevents the hook turning sidewise, and keeping it in a proper position to place upon or remove from it the ring of the bows of the eyeglass.

Secured to the back of shank A is a pin, D, hinged or pivoted like a breastpin. At the lower end of the shank is a catch, *a*, to secure the pin.

The device may be made in whole or in part of different materials, and as ornamental as desired.

The device is shown secured to a vest, in a position accessible to the hand of the wearer, and where it is not likely to be injured by contact with other things; but it may be attached elsewhere, and used for other purposes.

I believe myself to be the first to combine a spring snap-hook shank and securing-pin in one device; and, therefore,

What I claim as my invention, and desire to secure by Letters Patent, is—

As a new article of manufacture, an eyeglass - holder, consisting essentially of the shank A, spring snap-hook B, and pin D, constructed and arranged to operate substantially as and for the purpose described.

S. F. MERRITT.

Witnesses:
S. J. GORDON,
JOHN W. RIPLEY.